(12) United States Patent
Harris et al.

(10) Patent No.: US 11,100,069 B2
(45) Date of Patent: Aug. 24, 2021

(54) ELEMENT IDENTIFICATION IN A TREE DATA STRUCTURE

(71) Applicant: Neural Technology Limited, Stanmore (GB)

(72) Inventors: Benjamin Lewin Harris, Stanmore (GB); Timothy Andre William George De Paris, Stanmore (GB)

(73) Assignee: NEURAL TECHONOLOGY LIMITED, London (GB)

( * ) Notice: Subject to any disclaimer, the term of this patent is extended or adjusted under 35 U.S.C. 154(b) by 0 days.

(21) Appl. No.: 14/479,074

(22) Filed: Sep. 5, 2014

(65) Prior Publication Data

US 2015/0134669 A1 May 14, 2015

(30) Foreign Application Priority Data

Sep. 6, 2013 (GB) .................................... 1315993
Jan. 24, 2014 (GB) .................................... 1401216

(51) Int. Cl.
*G06F 16/22* (2019.01)
*G06F 16/955* (2019.01)
*G06F 16/81* (2019.01)

(52) U.S. Cl.
CPC .......... *G06F 16/2246* (2019.01); *G06F 16/81* (2019.01); *G06F 16/955* (2019.01)

(58) Field of Classification Search
CPC .......................... G06F 17/30876; G06F 16/986
See application file for complete search history.

(56) References Cited

U.S. PATENT DOCUMENTS

| | | | | |
|---|---|---|---|---|
| 7,941,525 B1 * | 5/2011 | Yavilevich | .............. | H04L 67/22 709/203 |
| 9,361,379 B1 * | 6/2016 | Siddiqui | ........... | G06F 17/30864 |
| 2003/0088593 A1 * | 5/2003 | Stickler | ................... | G06F 16/40 |
| 2007/0043743 A1 * | 2/2007 | Chen | ................. | G06F 17/30917 |
| 2008/0077653 A1 * | 3/2008 | Morris | .................... | H04L 67/20 709/203 |
| 2008/0301075 A1 * | 12/2008 | Bolt | ......................... | G06N 3/08 706/25 |
| 2010/0070929 A1 * | 3/2010 | Behl | ................... | G06F 17/3089 715/854 |

(Continued)

*Primary Examiner* — William Spieler
(74) *Attorney, Agent, or Firm* — Timothy E. Siegel Patent Law, PLLC; Timothy E. Siegel (57) ABSTRACT

A computer-implemented method of providing unique identification information for an element in a tree data structure where the element does not have an independent, unique identifier associated therewith by which it can be identified without reference to any further element. The method comprises determining (130) identification information uniquely identifying an element in a structure model, by reference to another element in the structure having a unique identifier associated therewith by which the other element can be uniquely identified without reference to any further element in the structure. The unique identification information comprises a unique identifier of the other element by which said other element can be uniquely identified in the structure without reference to any further element in the structure, and path information uniquely identifying the element in the structure relative to the other element.

14 Claims, 6 Drawing Sheets

(56) References Cited

U.S. PATENT DOCUMENTS

| | | | |
|---|---|---|---|
| 2011/0179085 A1* | 7/2011 | Hammerschmidt | ........................ G06F 17/30935 707/797 |
| 2012/0166936 A1* | 6/2012 | Ayoub | ................ G06F 17/3089 715/235 |
| 2012/0290920 A1* | 11/2012 | Crossley | ............. G06F 11/3664 715/234 |
| 2014/0040786 A1* | 2/2014 | Swanson | ........... G06F 17/30899 715/760 |
| 2014/0245269 A1* | 8/2014 | Thukkaram | ......... G06F 11/3636 717/129 |

* cited by examiner

| Element | Location Description |
|---|---|
| <div id="div1"> | #div1 |
| <a href="http://www.example.com/"> | #div1 > a[href="http://www.example.com/"] |
| <div class="da_t"> | #div2 > div(3) |
| <footer> | Html(0) > body(0) > footer(0) |

FIGURE 5B

ELEMENT IDENTIFICATION IN A TREE DATA STRUCTURE

FIELD OF THE INVENTION

The invention relates to a computer-implemented method of providing unique identification information for an element in a tree data structure where the element does not have an independent, unique identifier associated therewith by which it can be identified without reference to any further element. The invention also relates to a related computer program product.

BACKGROUND

Web analytics is the measurement, collection, analysis and reporting of internet data for purposes of understanding and optimizing web usage. Web analytics can be used as a tool to assess and improve the effectiveness of a web site. On-site web analytics measure a visitor's behaviour once on a website. Data about clicks may be gathered by logging a click when it occurs, which requires functionality to pick up relevant information when the click occurs.

Conventional methods of detecting web analytics data for an element on a web page rely on using positional information (for example x, y coordinates). Web pages can be rendered differently by different browsers or in different operating systems. Also, responsive and adaptive techniques available may result in web pages being rendered differently by physically differing devices. Positional information in the form of coordinates may vary dependent on the physical resolution or other attributes of the display on which the web page is viewed. Conventional methods of detecting analytics data for an element are therefore unsuitable.

In a known document, U.S. Pat. No. 7,941,525, an attempt was made to address the problem of webpages being rendered differently by different browsers or in different operating systems. This involves mapping absolute coordinates of an element and a mouse click to invariant coordinates, which is complex and unsatisfactory.

It is an object of the present invention to address the above-mentioned issues.

SUMMARY OF THE INVENTION

In accordance with a first aspect of the present invention, there is provided a computer-implemented method comprising: determining, at a user device, that a user interaction has occurred with an element of a webpage; determining unique identification information uniquely identifying the interacted element in a structure model of the webpage; and causing sending of analytics data including said unique identification information to a data processing system.

Elements on which user interactions have taken place can thus be reliably identified and information on the user interactions with particular elements collected.

The determining of the unique identification information may comprise determining whether said interacted element has a unique identifier associated therewith by which the interacted element can be uniquely identified in the structure model without reference to any other element, and, if so, using said unique identifier as the unique identification information.

However, the unique identity of the element may not be present. While some elements may have a unique identity, it is common for elements of webpages to lack a value for an id attribute. The determining of the unique identification information for the element in the structure model is therefore advantageous.

The determining of the unique identification information for the interacted element may comprise determining the unique identification information for the interacted element by reference to another element in the structure model that can be uniquely identified in the structure model without reference to any further element.

The method may comprise, before the determining of the unique identification information for the element, determining that the element does not have a unique identifier associated therewith by which it can be uniquely identified without reference to any further element.

The unique identification information may comprise a unique identifier of the other element by which said other element can be uniquely identified in the structure model without reference to any further element in the structure model, and path information uniquely identifying the interacted element in the structure model relative to the other element.

The other element may be one of: the root element and, if any are present, an element between said interacted element and the root element.

The determining of the unique identification information may comprise: determining the other element and the unique identifier thereof; determining the path information; and forming the unique identification information from the unique identifier of the other element and the path information.

The determining of the path information may comprise determining information distinguishing the interacted element from any sibling element thereof, and, if at least one element is present between the interacted element and the other element, also determining information distinguishing the or each element from any sibling element thereof, and forming the path information from said distinguishing information.

The determining of the other element may comprise: determining for the next higher element from the interacted element in the structure model whether a unique identifier is available by which the next higher element can be identified without reference to any further elements in the structure model and, if so, determining that next higher element to be the other element.

If it is determined that a unique identifier by which the next higher element can be identified without reference to any further elements in the structure model is not available, the method may further comprise determining consecutively for the or each subsequent higher element whether a unique identifier is available for the respective higher element by which the respective higher element can be uniquely identified without reference to any further elements.

The determining of the unique identification information may comprise: (i) determining path information by which the interacted element can be distinguished from any sibling element; (ii) determining whether a unique identifier is available by which the next higher element from the interacted element can be uniquely identified in the structure model without reference to any further element in the structure model; if a unique identifier is available for the next higher element by which the next higher element can be identified without reference to any further element, forming the unique identification information from the unique identifier and the path information; if a unique identifier is not available for the next higher element by which the next higher element can be identified without reference to any further element, then, for the or each subsequent higher element up to the root element, repeating steps (i) and (ii) with consecutively higher elements in place of the interacted element in step (i) and consecutively higher elements relative to the element in step (ii) until a higher element is identified for which a unique identifier is available by which the respective element can be uniquely identified in the structure model without reference to any further element in the structure model, determining said element to be the other element, and forming the unique identification information from the unique identifier and the path information.

The structure model may be the Document Object Model.

The unique identifier is advantageously independent of any coordinate based position information determined for the element.

The method may further comprise determining whether at least one of the following criteria is met, and if at least one is met, proceeding with the determining the unique identification information, the criteria requiring: presence of a class name on the element; presence of a unique id on the element; presence of a custom data attribute on the element; type of element; presence of at least one event bound to the element through execution of scripts upon the web page; text content or child elements contained within the element; position of the element within the structure model; predetermined style or design aspect applied to the element.

The method may comprise determining that the element or the other element has a unique identifier associated therewith if the element has: (a) a unique id of the element associated therewith; (b) a custom data attribute; (c) a specific attribute having a value; (d) a Cascading Style Sheet (CSS) class assigned thereto; (e) a text content or child elements contained therein; and (f) a combination of two or more of the criteria (a) to (e).

The method may further comprise: downloading, by a web browser, of the webpage, wherein the webpage comprises tracking code; executing of the tracking code to retrieve a computer program comprising computer program code, which when executed by processing apparatus, performs or causes to be performed the method of claim 1.

In accordance with a second aspect of the present invention, there is provided a computer program product comprising computer code stored in a memory of a user device and which, when executed by processing apparatus of the user device, is configured to cause the user device to perform the steps of: determining, at the user device, that a user interaction has occurred with an element of a webpage; determining unique identification information uniquely identifying the interacted element in a structure model of the webpage; and causing sending of analytics data including said unique identification information to a data processing system.

The determining of the unique identification information for the interacted element may comprise determining the unique identification information for the interacted element by reference to another element in the structure model that can be uniquely identified in the structure model without reference to any further element.

The code and the processing apparatus, when the code is executed by the processing apparatus, may be configured to cause the user device to perform the any of the methods described above of the first aspect of the present invention.

In accordance with a third aspect of the present invention, there is provided a computer-implemented method comprising: determining unique identification information uniquely identifying an element of a webpage in a structure model of the webpage, by reference to another element in the structure model having a unique identifier associated therewith by which the other element can be uniquely identified in the structure model.

The unique identification information may comprise a unique identifier of the other element by which said other element can be uniquely identified in the structure model without reference to any further element in the structure model, and path information uniquely identifying the interacted element in the structure model relative to the other element.

BRIEF DESCRIPTION OF THE FIGURES

For better understanding of the present invention, embodiments will now be described, by way of example only, with reference to the accompanying Figures in which.

DETAILED DESCRIPTION OF EMBODIMENTS

Embodiments of the present invention relate to collecting data on user interaction on a user device with elements of a web property. The term "web property" is herein understood to include content of web sites, web pages, extranet sites, or other content delivered through a web browser or web-enabled device.

The term "user interaction" herein includes, but is not limited to, any one or more of: clicks and touches; key presses; mouse movements; scrolling vertically or horizontally within a viewport; gestures including swipes and zooms; browser commands, for example "back" and "forward" navigation commands or exiting of the browser; and voice commands.

HTML is composed of a tree of HTML elements and other nodes, such as text nodes. Each element can have HTML attributes specified. The nodes of every HTML document are organized in a tree structure, called the Document Object Model (DOM) tree, with a topmost node named the "Document object". The DOM defines the logical structure of HTML documents. The DOM represents the relationships between elements in HTML documents. When an HTML page is rendered in a browser, the browser downloads the HTML into a local memory and automatically parses it to display the page on screen. The DOM is also the way JavaScript transmits the state of the browser in HTML pages.

Figure 1:
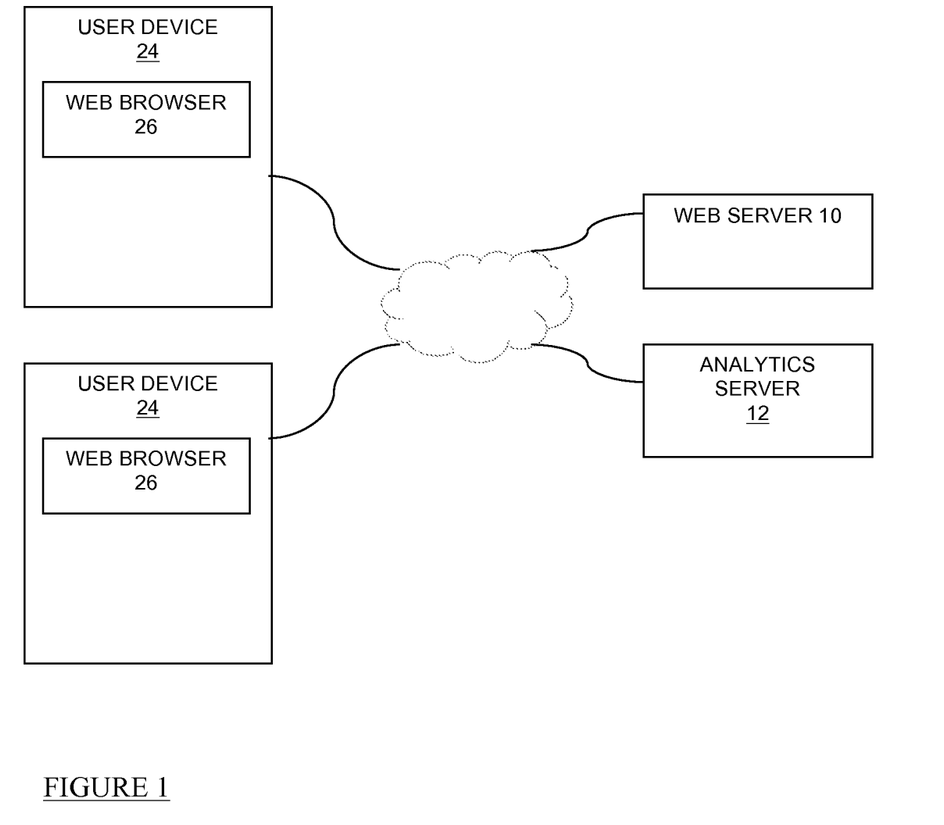
FIG. 1 is a network diagram of basic elements with which embodiments of the present invention may be performed.

Referring to FIG. 1, a network includes a web server 10, an analytics server 12 and two user devices 24, the user devices 24 being in communication with the web server 10 and the analytics server 12 over a communications network. It will be appreciated that in reality there are many more than two user devices in communication with the web server 10 and the analytics server 12.

Each user device includes a web browser 26 stored in a memory (not shown) and executable to perform the functionality ascribed to it herein. Each user device may be different; each may be a different machine with a different operating system running a different web browser. The user devices may be smartphones, laptops, tablets, PCs, or any other device capable of running a web browser.

The analytics server 12 is configured to receive analytics data from the user devices 24 when users of the user devices access suitably configured websites. Web pages downloaded from such websites include tracking code, for example in the form of javascript or other machine readable code. The tracking code is configured to result in analytics data being sent to the analytics server 12 in response to predetermined user interactions.

Each of the web server 10, the analytics server 12 and user devices 24 includes one or more input and output (I/O) interfaces, a network interface, a memory and one or more processors. The I/O interface may be connected to, for example, a monitor, keyboard and mouse. The server or device may be connected to the internet via the network interface. The memory typically includes a hard disk and RAM, but is not limited to such. The memory may include volatile and non-volatile, removable and non-removable media configured for storage of information, such as RAM, ROM, Erasable Programmable Read Only Memory (EPROM), Electrically Erasable Programmable Read Only Memory (EEPROM), flash memory or other solid state memory, CD-ROM, DVD, or other optical storage, magnetic disk storage, magnetic tape or other magnetic storage devices, or any other medium which can be used to store information which can be accessed.

In each of the web server 10, the analytics server 12 and user devices 24, the one or more processors may comprise a general-purpose processor or special purpose processing hardware. Each of the servers and user devices 24 may have a single or multiple processors. Each of the servers and user devices 24 is controlled by an operating system, for example, Microsoft Windows or Linux. Each of the servers may comprise a plurality of connected servers.

The tracking code can be added to any website wishing to track predetermined user interactions with web page elements and is embedded in each webpage.

Since users may interact with the web property using a number of different kinds of device, with different operating systems and using different browser, the same web site may appear differently to different users. Further, adaptive websites and websites constructed using Responsive Web Design are intended to display differently on different devices or operating systems or in different browsers or to different users, etc.

A web analytics client program within a web browser is configured to track predetermined user interactions on one or more elements of a web page. The analytics client program provides a buffer in which data to be sent to the analytics server 12 is sent.

Figure 2:
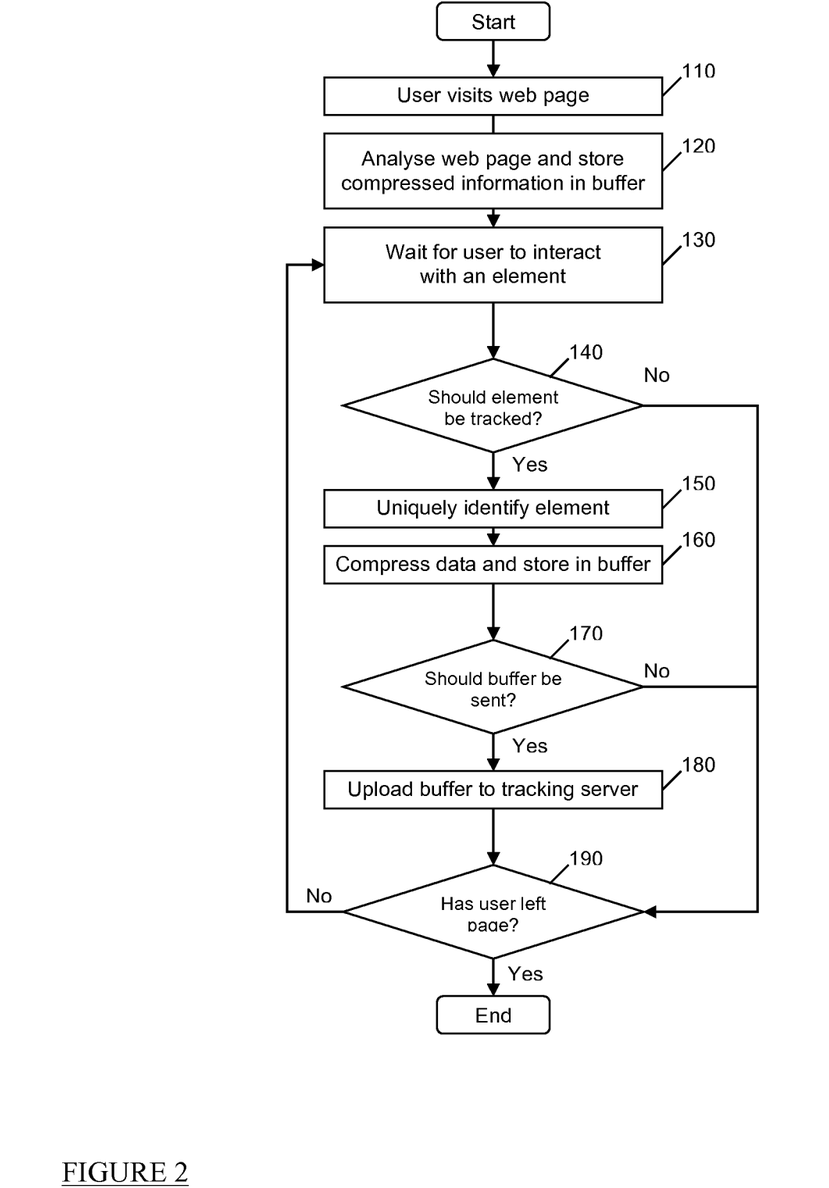
FIG. 2 is a flowchart indicating steps involved in tracking user interactions on particular elements of a webpage.

A process of determining analytics data describing user interaction with particular elements of a webpage is now described with reference to FIG. 2. The webpage includes the tracking code embedded within the web page. First, in step 110, the user downloads the webpage onto the user device 24. Executing of the tracking code causes the web browser 26 to retrieve and run the web analytics client program.

In step 120, the web analytics client program parses the webpage to determine relevant general analytics data. This general analytics data includes an identifier of the webpage (e.g. the URL) and may further include any one, some or all of: an identifier of the URL of a referring page, an identifier of browser type, an identifier of the operating system, an identifier of a flash version being run, and user location information for example city, region, country, isp, company, etc.

The web analytics client program compresses the general analytics data and stores it in the buffer for future sending to the web analytics system. Embodiments of the invention are not limited to any particular method of compression. The compression may include: mapping of data to shorter representations of the data using a predefined associative data structure; conversion of numeric values to a higher base; application of existing open compression schemes such as GZIP.

As indicated in step 130, the analytics client program monitors user interaction upon one, some or all of the tracked elements of the webpage, all of which form part of the DOM. At step 140, a user interaction is detected upon one of the tracked elements and the analytics client program determines whether the user interaction performed by the user upon the particular element is of interest and whether tracking of the user interaction should proceed.

The analytics client program has rules to make this determination, and the process by which the determination of whether tracking of the user interaction on this particular element should continue is described below with reference to FIG. 3.

If in step 140 it is determined that the particular element is to be tracked, then in step 150 the analytics client program executes an algorithm to uniquely identify the element upon which the user interaction has occurred. Steps involved in this algorithm are described below with reference to FIG. 4.

In step 160, the analytics data comprising identification information of the element and data on the particular user interaction is compressed and stored in the buffer at the user device 24 for future sending to the Web analytics server 12.

In step 170, the analytics client program determines whether a criterion for sending the analytics data including the user interaction information to the analytic server 12 is met. The criterion is met if one of the following is true: a predetermined period has ended since the analytics client program began monitoring user interactions on the webpage; a predetermined period has ended since the analytics data was last sent from the buffer to the analytic server 12; a specific type user interaction has occurred upon a particular element of the webpage; and the user leaves the webpage. The analytics data may alternatively be sent in dependence on other criteria being met.

In step 180, the analytics client program sends the analytics data to the analytics server 12. The analytics data may be sent in a conventional way via the network interface, involving transmission over air where the user device is wireless. The analytics data may be sent by, for example, encoding the analytics data and sending it to the analytic server 12 in a query string of a HTTP request, or by passing the analytics data to the server 12 through a Web socket.

In step 190, the analytics client program determines if the last detected user interaction is such as to cause the user to leave the webpage. If so, the tracking of user interactions on the elements of the webpage by the analytics client program ends.

Figure 3:
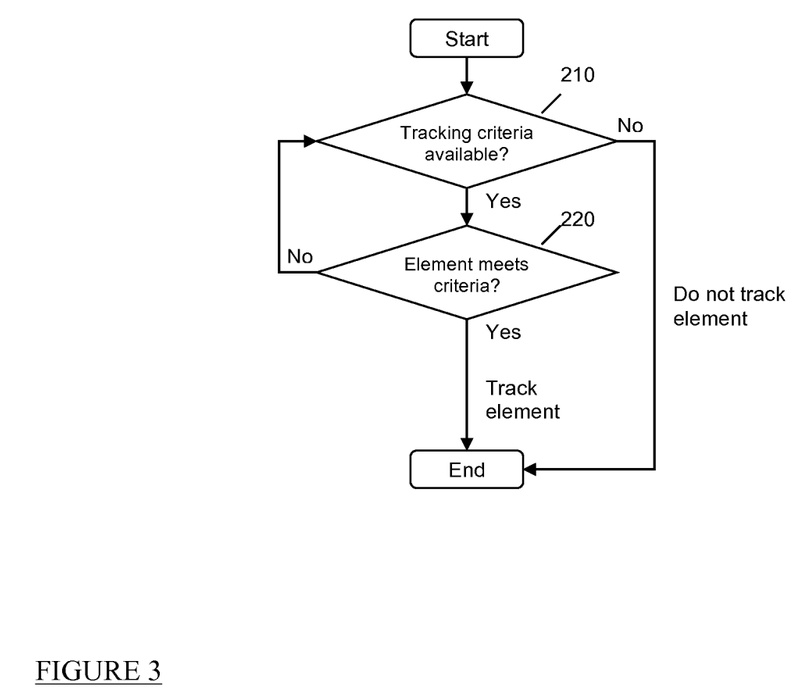
FIG. 3 is a flowchart indicating steps involved in determining whether an element upon which a user interaction has occurred is an element that is to be tracked.

Referring to FIG. 3, a process for determining whether the element upon which a user interaction has occurred and which is in the DOM is to be tracked. In step 210, the analytics client program executes in turn rules in an ordered list of rules. If, as indicated at step 220, the element in question does not meet the requirement of a rule, the next rule is executed. If the rules are executed until no more rules remain and none of the rules is met, the tracking of the particular user interaction on the element by the analytics client program is discontinued. If the requirement of any one of the rules is met, the tracking is continued. The rules include but are not limited to:
 (a) a particular class name on the element is present;
 (b) a unique ID on the element is present;
 (c) a custom data attribute on the element is present;
 (d) a type of element indicator (for example, an anchor tag) is present;
 (e) one or more events (for example JavaScript events) bound to the element through the execution of scripts upon the web page is present;
 (f) a text content or one or more child elements is contained within the element;
 (g) a position of the element within the HTML tree is identifiable; and
 (h) predetermined aspects of style or design applied to the element (for example the font size or weight) are identifiable.

Figure 4:
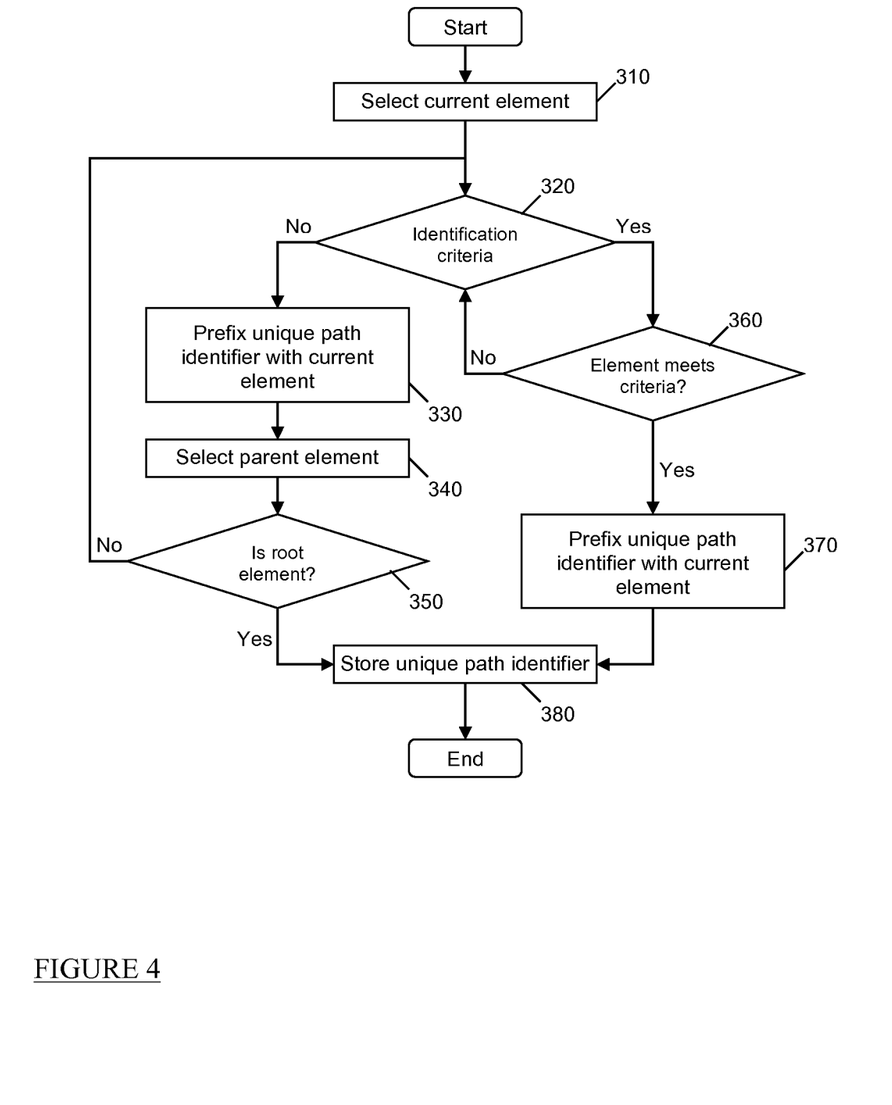
FIG. 4 is a flowchart indicating steps involved in determining unique identification information for an element to be tracked.

Referring to FIG. 4, steps of a process performed by the analytics client program to uniquely identify the element upon which a user interaction has occurred are now described. In brief, the process initially involves trying to determine whether the element has a unique identifier associated with it by which the element can be uniquely identified in the DOM without reference to any other elements in the DOM. Where the element does not have such a unique identifier associated with it, the process includes determining identification information for the tracked element to uniquely identify the element in the DOM. This is achieved by identifying a suitable other element in the DOM for which a unique identifier can be determined by which the other element can be uniquely identified in the DOM, and providing path information from the other element to the tracked element in the DOM. Thus, the tracked element can be identified by reference to the other element.

In greater detail, first, the analytics client program selects within the DOM the element upon which the user interaction was determined to have occurred at step 310, i.e. the tracked element. In step 320, the analytics client program then attempts to determine unique identification information for the tracked element in the form of a unique identifier. The unique identifier is a piece of information by which an element in the DOM can be identified independently, without reference to any other element in the DOM. To determine the unique identifier, the analytics client program selects a first criterion from an ordered list of criteria. The criteria include but are not limited to the element having the following piece of information associated therewith:
 (a) a unique identity;
 (b) a custom data attribute;
 (c) a specific attribute having a value (for example the "href" attribute of an anchor element);
 (d) a Cascading Style Sheet (CSS) class assigned thereto;
 (e) a text content or child elements contained therein; and
 (f) a combination of two or more of the previously described criteria.

The list may be otherwise ordered.

At step 360, the analytics client program determines whether the selected criterion is met. If the selected criterion is not met, the process returns to step 320, in which the next criterion from the ordered list is selected. Then at step 360, the analytics client program determines whether that selected criterion is met. If the criterion is not met, the process returns to step 320 and the next criterion in the list is selected. That process continues with steps 320 and 360 being repeated until either a criterion is met or until the last criterion in the ordered list is not met.

If the last criterion in the ordered list is not met, the process proceeds to step 330. Step 330 enables the tracked element to be identified with reference to its parent element. To this end, at step 330, path information is determined by the analytics client program. The path information comprises a path identifier identifying the tracked element distinct from any sibling elements, i.e. elements having the same parent element. The path information is determined by the web analytics client program using a domain specific language to describe the tracked element. Notably the process of FIG. 3 generally prevents elements from being tracked for which this is not possible.

In step 340, the analytics client program traverses upwards through the DOM from the tracked element, selecting the tracked element's parent element.

In step 350, the analytics client program determines whether it has reached the root element of the DOM, that is, determines if the parent element is the root element. If the root element has not been reached, the web analytics client program returns to step 320 in order to determine whether the parent element itself can be uniquely identified in the DOM. Steps 320 and 360 are repeated iteratively until either one of the criteria is met in step 360 or none of the identification criteria is met.

Where none of the identification criteria is met, the process returns to step 330 in which the path information is modified to include a unique path identifier for the currently selected parent element, which enables the currently selected parent element to be distinguished from any of its siblings.

The process then proceeds to step 340 where the next higher element in the DOM is selected. The process proceeds iteratively until either an identification criterion is met for progressively higher elements in step 360 or the parent element selected in step 340 is determined to be the root element. The root element is always uniquely identifiable. Where the parent element is the root element, the analytics client program determines unique identification information for the tracked element in the DOM using the root element and the path information.

If in step 360 a criterion is met, the analytics client program determines the piece of information. Then, at step 370, the analytics client program 5 prefixes the path information between the current and the tracked element with a unique identifier based on the piece of information and with which the current parent element can be uniquely identified in the DOM. When the unique identification information is determined for the tracked element, it is stored in the buffer in step 380.

Figure 5A:
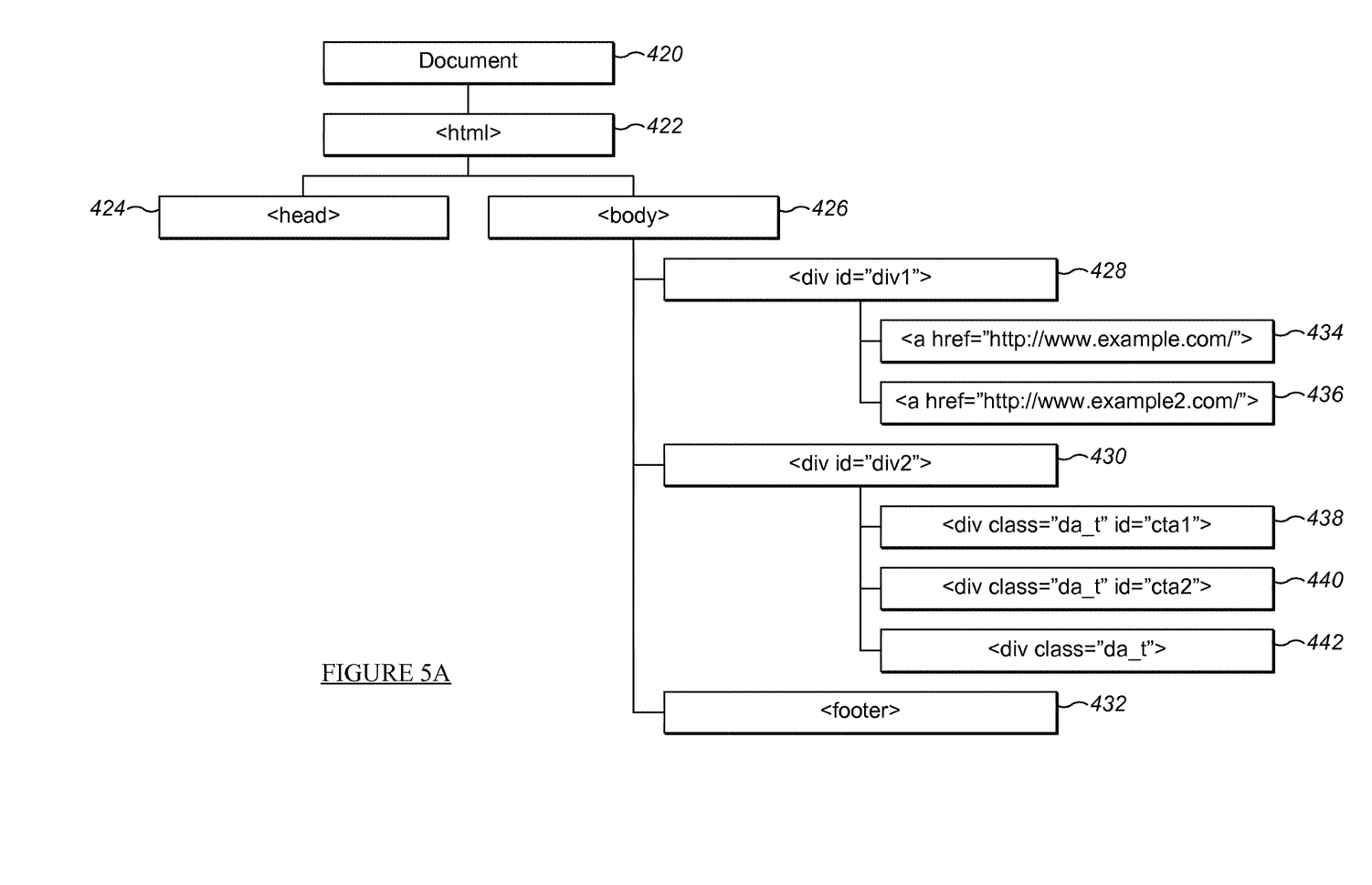
FIG. 5A is a diagram of a tree of HTML elements.

FIGS. 5A provides an illustrative example of a tree structure by reference to which it can be better understood how elements may be identified. The tree structure comprises a document 420 at the top of the tree structure with a first element 422 in the form of a root element below. The root element 422 is the parent element of second and third elements in the form of a head element 424 and a body element 426. The body element 416 is the parent element of fourth, fifth and sixth elements 428, 430, 432, which are child elements. The sixth element 422 is a footer element. The fourth element 428 is also a parent element of seventh and eighth child elements 434, 436. The fifth element 430 is also a parent element of ninth, tenth and eleventh elements 438, 440, 442.

The fifth element 428 states: <div id="div1">. The sixth element 430 states <div id="div2">. The seventh element 432 states <footer>. The eighth element 434 states <a href="http://www.example.com/">. The ninth element 436 states <a href="http://www.example.com/">. The tenth element 438 states <a href="http://www.example.com/">. The tenth element 440 states <div class="da_t" id="cta2">. The eleventh element 442 states <div class="da_t">.

The root element 422 is uniquely identifiable as such. The fourth, fifth, ninth and tenth elements 428, 430, 438, 440 are each uniquely identifiable by virtue of their unique identifiers. Accordingly, their location in the tree structure can be found. For example, as indicated in row 444 in FIG. 5B, the fourth element is uniquely identified by the identifier "#div1". Its location in the DOM can therefore be found.

The same is not true for the seventh, eighth and eleventh elements 434, 436, 442. Referring to FIG. 1B, as shown in row 446, the seventh element 434 is identified with reference to its parent. The path information from the parent to the seventh element 434 is an href value, which usually distinguishes the seventh element from the eighth element 436 which has the same parent. Accordingly, the unique identifier of the parent (fourth element 426) together with the path information provides unique identification information by which the location of the seventh element in the tree structure can be identified.

Figure 5B:
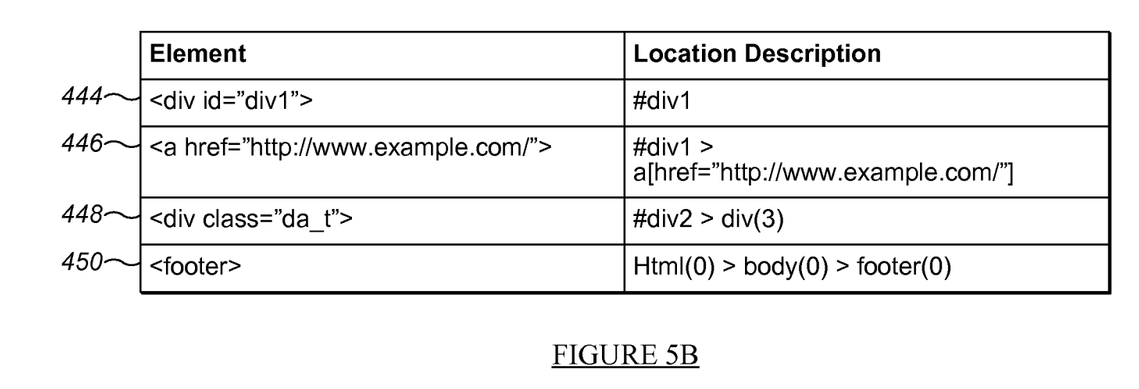
FIG. 5B is a table indicating how the location of HTML elements may be uniquely described.

Referring further to FIG. 5B, s shown in row 448, the eleventh element 442 is also identified with reference to its parent, the fifth element 430, which has a unique identifier. The path information from the parent to the eleventh element 442 is an indication that the eleventh element is the third child element. The unique identifier of the parent together with the path information provides unique identification information by which the location of the eleventh element in the tree structure can be identified.

As shown in row 450, the footer element can be identified by reference to its parent element (the body element 426) and the parent element of the body element, which is the root element 422. Thus, the location of the footer is uniquely identified and the location of the footer element 432 can be found in the tree structure.

Using the process of FIG. 4, each of the first to eleventh elements is thus uniquely identifiable, even though not all have a specific unique identifier (id).

The analytics server 12 is configured to decompress received analytics data and process the analytics data so information of user interaction is available for the tracked elements in the DOM. The information is accessible for reporting purposes.

It will be appreciated by persons skilled in the art that various modifications are possible to the embodiments.

Embodiments of the invention are not limited to providing an identifier of an element in a DOM or HTML tree of a web page by reference to another identifiable element, but may be applicable where identification is desired of an element in any tree structure and no independent, unique identifier is available without reference to parent elements. As well as defining the logical structure of HTML documents, a DOM can define the logical structure of XHTML and XML documents, thereby representing the relationships between objects in XHTML and XML documents. Embodiments of the present invention can also be used to identify XHTML and XML elements in XHTML and XML documents.

The applicant hereby discloses in isolation each individual feature or step described herein and any combination of two or more such features, to the extent that such features or steps or combinations of features and/or steps are capable of being carried out based on the present specification as a whole in the light of the common general knowledge of a person skilled in the art, irrespective of whether such features or steps or combinations of features and/or steps solve any problems disclosed herein, and without limitation to the scope of the claims The applicant indicates that aspects of the present invention may consist of any such individual feature or step or combination of features and/or steps. In view of the foregoing description it will be evident to a person skilled in the art that various modifications may be made within the scope of the invention.

The invention claimed is:

1. A computer-implemented method of providing unique identification information for an element of a plurality of elements in a document object model (DOM), wherein the element is below a root element in the document object model and does not have an independent, unique identifier associated therewith by which it can be identified without reference to any further of the elements, comprising:
   downloading, by a web browser, of a webpage, to a user device, wherein the webpage comprises tracking code;
   executing of the tracking code to retrieve a computer program comprising computer program code, which, when executed by processing apparatus, performs or causes to be performed the following actions:
   determining that the element does not have a unique identifier associated therewith by which it can be uniquely identified without reference to any further element;
   in response to the determining that the element does not have a unique identifier, determining identification information uniquely identifying the element in the DOM, by reference to a higher one of the elements in the DOM having a unique identifier associated therewith by which the higher element can be uniquely identified without reference to any further of the elements in the DOM, wherein the unique identification information comprises the unique identifier of the higher element; and
   deterministically chosen path information uniquely identifying the element in the DOM relative to the higher element, in a repeatable manner, thereby forming unique identification information for the element;
   causing the sending of analytics data, including data relating to said element identified by the unique identification information, to a data processing system; and
   wherein the higher element is between said element and the root element, and the path information comprises distinguishing information distinguishing the element from any sibling element thereof, the distinguishing information consisting of one of: a custom data attribute; a type of element indicator; an event bound to the element through execution of scripts upon the webpage; text content of the element; and child elements contained within the element.

2. The method of claim 1, wherein the determining of the unique identification information comprises:
   determining the higher element and the unique identifier thereof;
   determining the path information; and
   forming the unique identification information from the unique identifier of the higher element and the path information.

3. The method of claim 2, wherein the determining of the higher element comprises:
   determining for the next higher element from the element in the document object model whether a unique identifier is available by which the next higher element can be identified without reference to any further elements in the DOM and, if so, determining that next higher element to be the higher element.

4. The method of claim 3, wherein, if it is determined that a unique identifier by which the next higher element can be identified without reference to any further elements in the DOM is not available, determining consecutively for the or each subsequent higher element whether a unique identifier is available for the respective subsequent higher element by which the respective higher element can be uniquely identified without reference to any further element.

5. The method of claim 1, wherein the determining of the unique identification information comprises:
(i) determining path information by which the element can be distinguished from any sibling element;
(ii) determining whether a unique identifier is available by which a next higher element from the element is uniquely identified in the DOM without reference to any further element in the DOM;
if a unique identifier is available for the next higher element by which the next higher element can be identified without reference to any further element, forming the unique identification information from the unique identifier and the path information;
if a unique identifier is not available for the next higher element by which the next higher element can be identified without reference to any further element, then, for the or each subsequent higher element up to the root element, repeating steps (i) and (ii) with consecutively higher elements in place of the element in step (i) and consecutively higher elements relative to the element in step (ii) until a higher element is identified for which a unique identifier is available by which the respective higher element can be uniquely identified in the DOM without reference to any further element in the DOM, determining said identified element to be the higher element, and forming the unique identification information from the unique identifier and the path information.

6. The method of claim 1, wherein the unique identifier is independent of any coordinate-based position information determined for the element.

7. The method of claim 1, further comprising determining whether at least one of the following criteria is met, and if at least one is met, proceeding with the determining the unique identification information, the criteria requiring:
presence of a class name on the element;
presence of a unique id on the element;
presence of a custom data attribute on the element; type of element;
presence of at least one event bound to the element through execution of scripts upon the web page;
text content or child elements contained within the element;
position of the element within the DOM;
predetermined style or design aspect applied to the element.

8. The method of claim 1, comprising determining that the higher element has a unique identifier associated therewith if the element has one of:
(a) a unique id of the element associated therewith;
(b) a custom data attribute;
(c) a specific attribute having a value;
(d) a Cascading Style Sheet (CSS) class assigned thereto;
(e) a text content or child elements contained therein; and
(f) a combination of two or more of the criteria (a) to (e).

9. The method of claim 1, wherein the element is an HTML, XHTML or XML element.

10. The method of claim 1, wherein the determining that the element does not have a unique identifier associated therewith, is performed in response to determining, at the user device, that a user interaction has occurred with the element of the webpage.

11. The method of claim 1, wherein the sending of analytics data including said unique identification information to a data processing system further includes sending data on the particular user interaction with the element.

12. A computer program product for use in an analytics system and for providing unique identification information for an element in a document object model (DOM) of a webpage, wherein said element is below a root element, and sending this identification information with analytics data relating to said element to a data processing system to identify said element in relation to the analytics data relating to said element, where it has first been determined that the element does not have an independent, unique identifier associated therewith by which it can be identified without reference to any further element, comprising computer code stored in a memory of a user device, wherein, when the code is executed by processing apparatus of the user device, the processing apparatus and the code are configured to cause the user device to perform:
determining unique identification information uniquely identifying an element in the DOM, by reference to a higher element in the DOM having a unique identifier associated therewith by which the higher element can be uniquely identified in the DOM without reference to any further element in the DOM, wherein the higher element is below the root element and above the element, and wherein the unique identification information comprises a unique identifier of the higher element and path information uniquely identifying the element in the DOM relative to the higher element, and wherein the path information comprises distinguishing information distinguishing the element from any sibling element thereof, the distinguishing information consisting of one of: a custom data attribute; a type of element indicator; an event bound to the element through execution of scripts upon the webpage; text content of the element; and child elements contained within the element.

13. In a computer-implemented method of tracking user activity on a webpage that corresponds to a document object model (DOM), displayed on a user's computer, wherein when the webpage is loaded onto the user's computer, tracking code is also loaded, together with the webpage, and wherein user activity data is sent to an analytics server by the tracking code, that stores user activity data from a plurality of user computers displaying the webpage and performs analysis upon the collected user activity data, an improvement to the operation of the tracking code, comprising:
for any element encountered in the DOM, wherein the element is below a root element in the DOM and does not have an independent, unique identifier associated therewith, thereby being an untagged element, by which it can be identified without reference to any further of the elements:
determining identification information uniquely identifying the untagged element in the DOM, by reference to a higher one of the elements in the DOM having a unique identifier associated therewith by which the higher element can be uniquely identified without reference to any further of the elements in the DOM, and wherein the unique identification information comprises the unique identifier of the higher element and deterministically chosen path information uniquely identifying the untagged element relative to the higher element, in a repeatable manner, thereby forming unique identification information for the untagged element, the unique identification consisting of one of: a custom data attribute; a type of element indicator; an event bound to the element through execution of scripts upon the webpage; text content of the element; child elements contained within the element; and causing the unique identification information to be sent to the analytics server, when user activity data relating to the untagged element is sent to the analytics server.

14. The method of claim 13, wherein the untagged element is encountered when the user interacts with it, thereby causing the action of determining identification information to be performed.

* * * * *